United States Patent
Lubben et al.

(10) Patent No.: US 12,196,195 B2
(45) Date of Patent: Jan. 14, 2025

(54) DEMAND BASED HYDRAULIC PUMP CONTROL SYSTEM

(71) Applicant: Deere & Company, Moline, IL (US)

(72) Inventors: Jeffrey L. Lubben, Hudson, IA (US); Dwayne A. Nystrom, Waterloo, IA (US); Thomas Butts, Jesup, IA (US)

(73) Assignee: Deere & Company, Moline, IL (US)

( * ) Notice: Subject to any disclaimer, the term of this patent is extended or adjusted under 35 U.S.C. 154(b) by 795 days.

(21) Appl. No.: 16/899,785

(22) Filed: Jun. 12, 2020

(65) Prior Publication Data

US 2021/0388830 A1    Dec. 16, 2021

(51) Int. Cl.
| | |
|---|---|
| *F04B 49/00* | (2006.01) |
| *F04B 17/05* | (2006.01) |
| *F04B 23/04* | (2006.01) |
| *F04B 49/02* | (2006.01) |
| *F04B 49/20* | (2006.01) |

(52) U.S. Cl.
CPC ............ *F04B 49/002* (2013.01); *F04B 17/05* (2013.01); *F04B 23/04* (2013.01); *F04B 49/02* (2013.01); *F04B 49/20* (2013.01); *F04B 2205/06* (2013.01); *F04B 2205/16* (2013.01); *F04B 2207/041* (2013.01)

(58) Field of Classification Search
CPC .......... F04B 17/05; F04B 23/04; F04B 49/02; F04B 2205/06; F04B 2205/16; F04B 2207/041
USPC ..................................... 417/15, 223
See application file for complete search history.

(56) References Cited

U.S. PATENT DOCUMENTS

| | | | | |
|---|---|---|---|---|
| 1,863,851 | A | * | 6/1932 | William ............... H02P 1/46 417/18 |
| 2,244,106 | A | * | 6/1941 | Granberg ............ B67D 7/04 137/565.33 |
| 3,068,796 | A | * | 12/1962 | Pfluger ............... F17D 1/14 417/18 |
| 3,092,970 | A | * | 6/1963 | Sampietro .......... B60K 17/10 180/242 |
| 3,465,519 | A | * | 9/1969 | Hubbard ............. F15B 11/16 60/422 |

(Continued)

FOREIGN PATENT DOCUMENTS

| | | |
|---|---|---|
| DE | 1505940 A1 | 8/1970 |
| DE | 19809302 A1 | 9/1999 |

(Continued)

OTHER PUBLICATIONS

Authors et al., "Centrifugal Clutch for Variable Engagement Between Input Member and Plural Output Members," ip.com, Nov. 3, 2017, http://ip.com/IPCOM/000251483, 26 pages.

(Continued)

*Primary Examiner* — Christopher S Bobish
(74) *Attorney, Agent, or Firm* — Tucker Ellis LLP; Evan T. Perry

(57) ABSTRACT

Systems and methods are provided for a demand-based hydraulic system. A clutch is positioned between a hydraulic pump and an engine. The clutch is selectively engaged to power the hydraulic pump based on a level of demand for hydraulic power. A control system is also provided to control the clutch and/or the pump in accordance with a plurality of operating mode.

20 Claims, 6 Drawing Sheets

(56) References Cited

U.S. PATENT DOCUMENTS

| | | | | |
|---|---|---|---|---|
| 3,744,932 | A * | 7/1973 | Prevett | G05D 9/12 417/7 |
| 3,775,025 | A * | 11/1973 | Maher, Jr. | F04D 15/0066 417/12 |
| 4,153,393 | A * | 5/1979 | Cook | B05B 9/0406 417/533 |
| 4,204,808 | A * | 5/1980 | Reese | G05D 16/2073 417/18 |
| 4,295,554 | A | 10/1981 | Schlagmüller et al. | |
| 4,355,959 | A * | 10/1982 | Kono | F04B 49/20 417/223 |
| 4,412,460 | A | 11/1983 | Barthelemy | |
| 4,580,947 | A * | 4/1986 | Shibata | F04C 28/02 417/53 |
| 4,674,612 | A | 6/1987 | Ogura | |
| 4,763,473 | A * | 8/1988 | Ziplies | F04B 49/06 60/329 |
| 5,165,862 | A * | 11/1992 | Lindblom | F04B 49/002 417/287 |
| 5,343,384 | A * | 8/1994 | Fisher | F04D 27/02 700/282 |
| 5,566,709 | A * | 10/1996 | Fujii | G21D 3/08 165/286 |
| 5,797,729 | A * | 8/1998 | Rafuse, Jr. | F04C 28/08 62/126 |
| 6,045,332 | A * | 4/2000 | Lee | F04D 15/029 137/565.33 |
| 6,165,096 | A | 12/2000 | Seith | |
| 6,659,726 | B2 * | 12/2003 | Holden | F04C 28/08 417/2 |
| 7,766,105 | B2 * | 8/2010 | Albright | B60K 25/06 701/67 |
| 7,815,539 | B2 | 10/2010 | Ward et al. | |
| 7,955,056 | B2 * | 6/2011 | Pettersson | G05D 16/2073 700/282 |
| 8,496,450 | B2 * | 7/2013 | Mellar | F04B 23/04 417/375 |
| 8,512,007 | B2 * | 8/2013 | Hebrard | B60T 17/02 417/316 |
| 8,668,465 | B2 * | 3/2014 | Wadsley | F04B 49/08 417/244 |
| 8,690,553 | B2 * | 4/2014 | Peters | F04B 17/05 417/429 |
| 8,924,093 | B2 * | 12/2014 | Husson | B60K 25/02 701/50 |
| 8,992,182 | B2 * | 3/2015 | Robinson | G05D 7/0617 700/282 |
| 9,404,545 | B2 * | 8/2016 | Bohn | F04B 39/121 |
| 9,629,299 | B2 * | 4/2017 | Swanson | E02F 3/3677 |
| 9,646,430 | B2 * | 5/2017 | Runde | G07C 5/0816 |
| 9,835,360 | B2 * | 12/2017 | Wang | F25B 49/022 |
| 9,850,885 | B2 * | 12/2017 | Sakamoto | E02F 9/226 |
| 9,863,135 | B2 * | 1/2018 | Wichmann | E03F 7/10 |
| 9,903,321 | B2 * | 2/2018 | Batenburg | F02M 31/183 |
| 10,508,730 | B2 * | 12/2019 | Buchmann | F01M 1/02 |
| 10,815,764 | B1 * | 10/2020 | Yeung | F04B 51/00 |
| 10,975,858 | B2 * | 4/2021 | Rüger | F04B 49/103 |
| 10,994,614 | B2 * | 5/2021 | Holverson | B60K 25/06 |
| 11,168,675 | B2 * | 11/2021 | Nassif | F04B 17/03 |
| 11,460,016 | B1 * | 10/2022 | Crowe | F02C 9/22 |
| 2009/0068031 | A1 * | 3/2009 | Gambier | F04B 17/06 417/364 |
| 2009/0193800 | A1 * | 8/2009 | Peters | E02F 9/2242 417/364 |
| 2016/0369609 | A1 * | 12/2016 | Morris | F16D 48/062 |
| 2020/0040878 | A1 * | 2/2020 | Morris | E21B 43/26 |
| 2020/0132063 | A1 * | 4/2020 | Sauerbier | F04B 49/22 |
| 2020/0232454 | A1 * | 7/2020 | Chretien | F04B 49/065 |
| 2024/0026868 | A1 * | 1/2024 | Morris | F04B 23/06 |

FOREIGN PATENT DOCUMENTS

| | | |
|---|---|---|
| DE | 69523181 T2 | 6/2002 |
| DE | 102009003242 A1 | 11/2010 |
| JP | 2000104799 A | 4/2000 |

OTHER PUBLICATIONS

German Search Report issued in application No. DE102021115052.3, dated Feb. 16, 2022, 5 pages.

\* cited by examiner

DEMAND BASED HYDRAULIC PUMP CONTROL SYSTEM

BACKGROUND

In vehicles, particularly agricultural vehicles, a hydraulic system may utilizes pumps to control a hitch or other implements. These pumps may power off-board implements through selective control valves (SCV) or power beyond ports. The pumps may also be utilized for on-board usage such as a 3-point hitch, a front hitch, a hydraulic center link, or the like. Often, the pumps are coupled to a vehicle drivetrain. Accordingly, the pumps operate while the vehicle engine is running. With this configuration, hydraulic power is available with minimal delay because the pumps continue to operate even absent a demand for power.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, a system is provided. The system includes a hydraulic pump coupled to an engine via a clutch. The system also includes a controller configured to control operation of the hydraulic pump and the clutch in accordance with a plurality of operating modes and a demand for hydraulic power.

In another implementation, method for a hydraulic system of an agricultural vehicle is provided. The method includes receiving a mode selection from an operator via an operator interface. The method also includes selectively activating one or more hydraulic pumps of a set of pumps based on the mode selected. The method further includes monitoring a level of demand for hydraulic power and selectively activating one or more additional hydraulic pumps in response to the level of demand.

In still another implementation, a non-transitory computer-readable storage medium having stored thereon computer-executable instructions is provided. The instructions, when executed by a processor, configure the processor to receive a selection of an operating mode from a plurality of operating modes for a hydraulic power system having a plurality of pumps that includes at least a first pump and a second pump. The instructions further configure the processor to provide a default state of the plurality of pumps in accordance with the operating mode. The instructions also configure the processor to adjust a state of the plurality of pumps based on the operating mode and an operational input.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

Various non-limiting embodiments are further described in the detailed description given below with reference the accompanying drawings, which are incorporated in and constitute a part of the specification.

DETAILED DESCRIPTION

Figure 1:
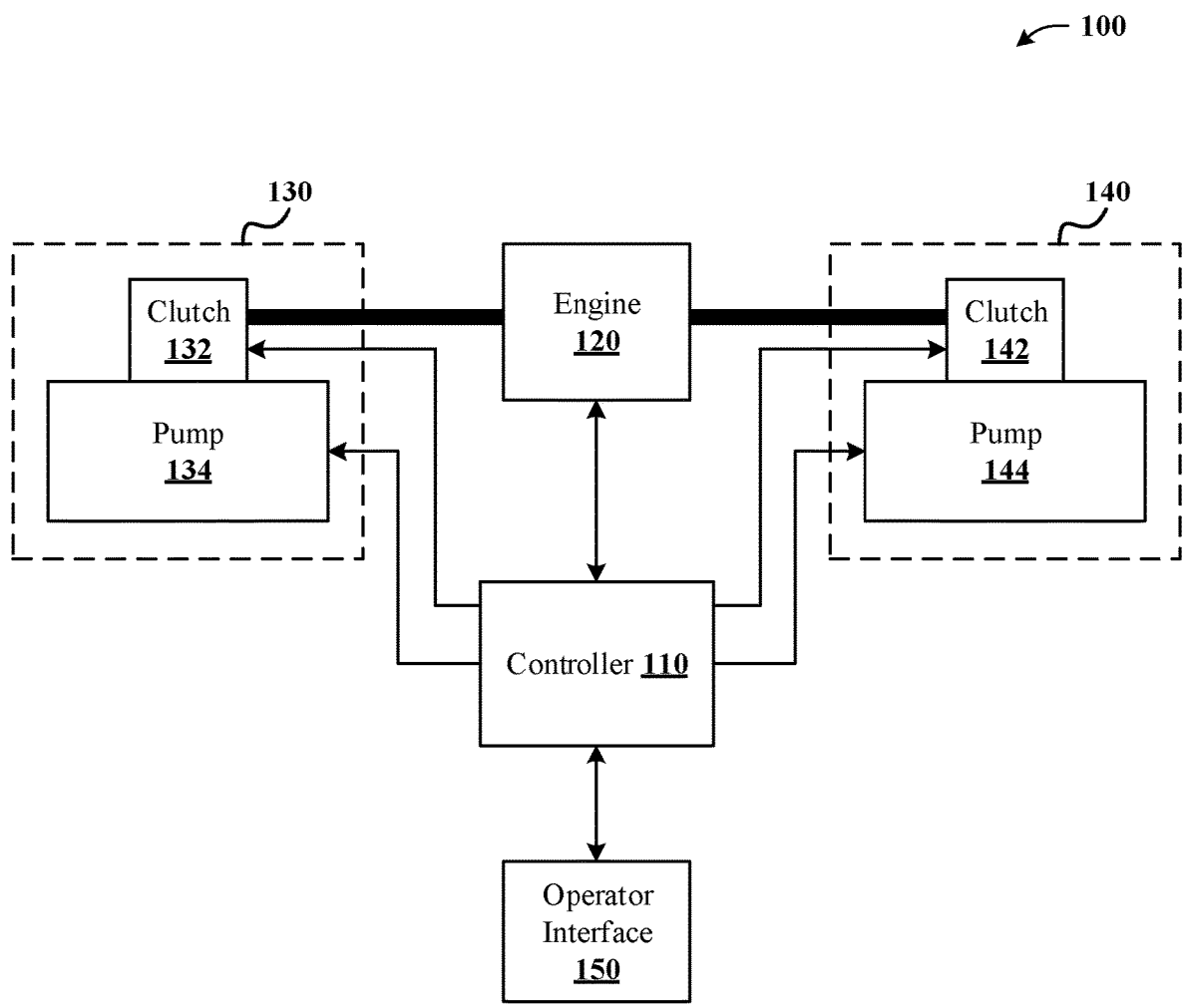
FIG. 1 illustrates an exemplary, non-limiting embodiment of a hydraulic system according to various aspects.

As described above, hydraulic systems may couple directly to a vehicle drivetrain. In particular, a pump of the hydraulic system is driven by the vehicle's drivetrain to deliver hydraulic power to various implements. With a direct coupling, however, the pump draws power from the vehicle engine even when demand or hydraulic power is absent. Even with a variable displacement pump, fluid flow may stop when demand is absent, but the pump itself continues to be driven by the vehicle drivetrain. There are situations during normal operation of an agriculture vehicle, for example, where off-board demand for hydraulic power is non-existent. Accordingly, fuel consumption may be reduced at such times by shutting off hydraulic pumps.

In accordance with various embodiments, a clutch may be positioned between an engine and a pump of a hydraulic system. The clutch allows the pump to stop in an absence of a demand for hydraulic power. By way of example, demand for hydraulic power may be absent during transport, engine start up, stationary idling, steady state work, etc.

In another embodiment, the pump may connect to various implements via a power beyond port or an SCV, or vehicle implements such as a 3-point hitch. The coupling is often controlled by electrohydraulic servo valves. These couplings may be operator controlled or automatically controlled. For instance, automated turning events or draft control are examples of automated control that may occur in the background. An operator actuating a switch or manipulating a paddle potentiometer (PP) are examples of manual control. When hydraulic pressure is demanded via manual or automated control, the clutch engages to power the pump and deliver hydraulic power. In some situations, a time delay may be allocated before power is delivered to allow the clutch to fully engage. A rate at which the clutch is applied may vary for different events. For instance, a soft start feature is provided to protect the pump and/or drivetrain from sudden acceleration of internal components.

According to other aspects, after activation, the clutch may disengage after a predetermined time. Further, the pumps may default to an off state during engine starts. This may reduce effects of parasitic starting loads. The clutch may also function as a fuse. For example, the clutch may disengage to protect the pump from overload, abnormal pressure transients, and/or pump seizures. Also, the clutch may disengage during overspeed or under speed events.

The automated, on-demand control of hydraulic power may be overridden by operator control. For example, an operator may activate a switch or other control to override hydraulic flow commands and bring the system to a continuous power default.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Referring initially to FIG. 1, a hydraulic system 100 is illustrated. The system 100 may be included in or utilized by an agricultural vehicle, such as a tractor, to provide a demand based hydraulic system. An engine 120 is coupled to a first pump system 130 and a second pump system 140. While FIG. 1 illustrates two pump systems, it is to be appreciated that the aspects described herein can be implemented in a hydraulic system that includes one pump system, tandem pumps or a hydraulic system having more than two pump systems. As shown in FIG. 1, first pump system 130 may include a clutch 132 and a pump 134 and the second pump system 140 may include a clutch 142 and a pump 144. Pumps 134, 144 may be fixed or variable displacement pumps that deliver a hydraulic fluid to provide hydraulic power to an implement or onboard system.

Pumps 134, 144 may be powered (e.g. spun) by engine 120 via a connection to a vehicle drivetrain or other crankshaft. In particular, the engine 120 drives pumps 134, 144 when respective clutches 132, 142 are engaged. When the clutches 132, 142 are disengaged, the pumps 134, 144 are not powered. Moreover, the clutches 132, 142 may be partially engaged such that the pumps 134, 144 are partially powered by engine 120.

Hydraulic system 100 may provide demand-based delivery of hydraulic fluid by selectively operating pumps 134, 144. For example, pumps 134, 144 may be selectively turned on or off in accordance with a demand for hydraulic power. To provide such flexibility, the system 100 includes a controller 110 configured to control operation of engine 120, clutches 132 and 142, and/or pumps 134, 144 to enable demand-based hydraulic power.

Controller 110 may include be a microcontroller, a system-on-a-chip, a FPGA, or other logic circuitry. For instance, controller 110 may include a processor, a computer memory (e.g. a non-transitory computer-readable storage medium), and interfaces to acquire inputs and send signals to various components of system 100. The memory may include computer-executable instructions that configure the processor to carry out the functions of controller 110 in system 100. In some embodiments, the controller 110 may be an electronic control unit such as an engine control unit (ECU) or the like. As such, the controller 110 may include a microcontroller, memory (e.g., SRAM, EEPROM, Flash, etc.), inputs (e.g., supply voltage, digital inputs, analog inputs), outputs (e.g., actuator inputs, logic outputs), communication interfaces (e.g., bus transceivers), and embedded software.

According to an embodiment, controller 110 controls operation of hydraulic system 100 in accordance with a plurality of operating modes. The plurality of operating modes may include, but are not limited to, an off mode, a demand mode, and a high, continuous or normal mode. Some modes may have associated sub-modes. For example, the demand mode may include a low flow mode and a high flow mode.

In a given mode, controller 110 controls first pump system 130 and/or second pump system 140. In one embodiment, controller 110 configures respective states of the first pump system 130 and the second pump system 140, and adjusts the states as needed according to the mode and an operating state of the vehicle. For example, in the off mode, the controller 110 can disengage at least one of clutch 132 or 142 to shut down the corresponding pump. In the demand mode, the controller can selectively activate one or both of pumps 134, 144 based on a level of demand for hydraulic power. For instance, if demand is low, a single pump may be sufficient. If demand is high or increases from a low demand state, the controller 110 can bring the second pump online to deliver additional hydraulic power.

System 100 may include an operator interface 150 that enables mode selection, or manual activation of demand for hydraulic power. The operator interface 150 may be incorporated into in-cab controls of the agricultural vehicle.

Figure 2:
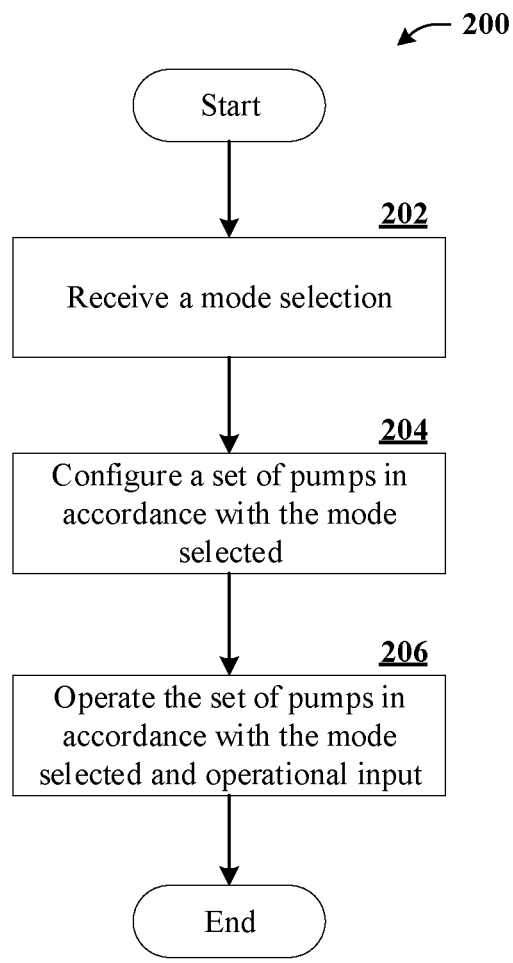
FIG. 2 illustrates an exemplary, non-limiting embodiment of a method for a demand based hydraulic power system in accordance with various aspects.

Turning to FIG. 2, an exemplary, non-limiting embodiment of a general control method 200 for a demand based hydraulic power system is illustrated. Method 200 may be carried out, for example, by hydraulic system 100 described above. In particular, method 200 may be performed by controller 110.

Method 200 may begin at 202 where a mode selection is received. The mode selection, in some embodiments, may include a normal mode, a demand-based mode, and an off mode. However, it is to be appreciated that other modes may be contemplated. For instance, the modes may include a low flow and high flow modes having defaults corresponding to anticipated levels of demand.

At 204, a set of pumps are configured in accordance with the mode selected. The system controlled in accordance with method 200 may include two or more hydraulic pumps that may be independently operated. In step 204, the controller 110 may set up the system to a baseline or a default state according to the mode selected. For example, if the off mode is selected, the controller 110 may disable all pumps. In a demand mode with a low flow preference, the controller 110 may also initially disable all pumps, but will activate at least one pump in response to a demand event (e.g. a demand for hydraulic power). In a demand mode with a high flow preference, the controller may initially activate at least one pump, but shut down other pumps until needed to meet a demand. Still further, in a conventional mode or normal mode, all pumps may be activated by default.

At 206, the pumps are operated in accordance with the mode selected. In some embodiments, the pumps are also operated in response to operational input. For instance, in a demand mode, the operational input may be a demand event (e.g. a request for hydraulic power for an implement). If the supply of hydraulic power from currently active pumps is insufficient to meet the demand, the controller may activate an additional pump. If the demand ceases, the controller may return to a default state after a predetermined amount of time. For example, controller may turn off the additional pump previously activated. In the example of an off mode or a conventional mode, operating the pumps in accordance therewith may involve maintaining the pumps in an off state or an activate state, respectively, unless an override or a new mode selection is received.

Figure 3:
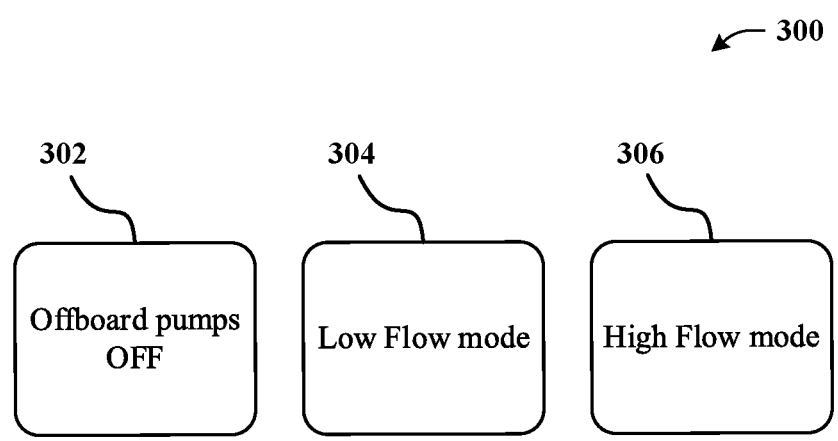
FIG. 3 illustrates an exemplary, non-limiting embodiment of a menu structure for a user interface according to various aspects.

Turning to FIG. 3, an exemplary, non-limiting embodiment of a menu structure 300 for controlling a demand based hydraulic power system is depicted. The menu structure 300 can used for an in-cab user interface, for example. The menu structure is exemplary and illustrates a few example operating modes. The hydraulic systems disclosed herein are not limited to the modes shown in FIG. 3 and other modes, which are readily apparent to one of skill in the art, are contemplated. As shown in FIG. 3, the menu structure 300 includes several modes that may be selected via a touchscreen interface or other user interface (e.g. buttons, switches, etc.). For example, the menu structure 300 can include a first interface element 302 that selects an off mode where the off-board pumps are turned off. This mode, for example, disable off-board usages of hydraulic power (e.g. hitch or SCV demand), but may not disable on-board usages such as power steering, brakes, etc. It is to be appreciated that a demand event in this mode may trigger activation of at least one pump.

A second interface element 304 may select a low flow mode. In this mode, a system having two pumps may keep one pump off and run the other. This mode may be appropriate for light hitch usage or low SCV demand. As before, an increase in demand may trigger activation of more pumps. A third interface element 306 may select a high flow mode. In this mode, the system may activated all pumps (e.g. both pumps in a two pump system) to satisfy high demand for hydraulic power.

Figure 4:
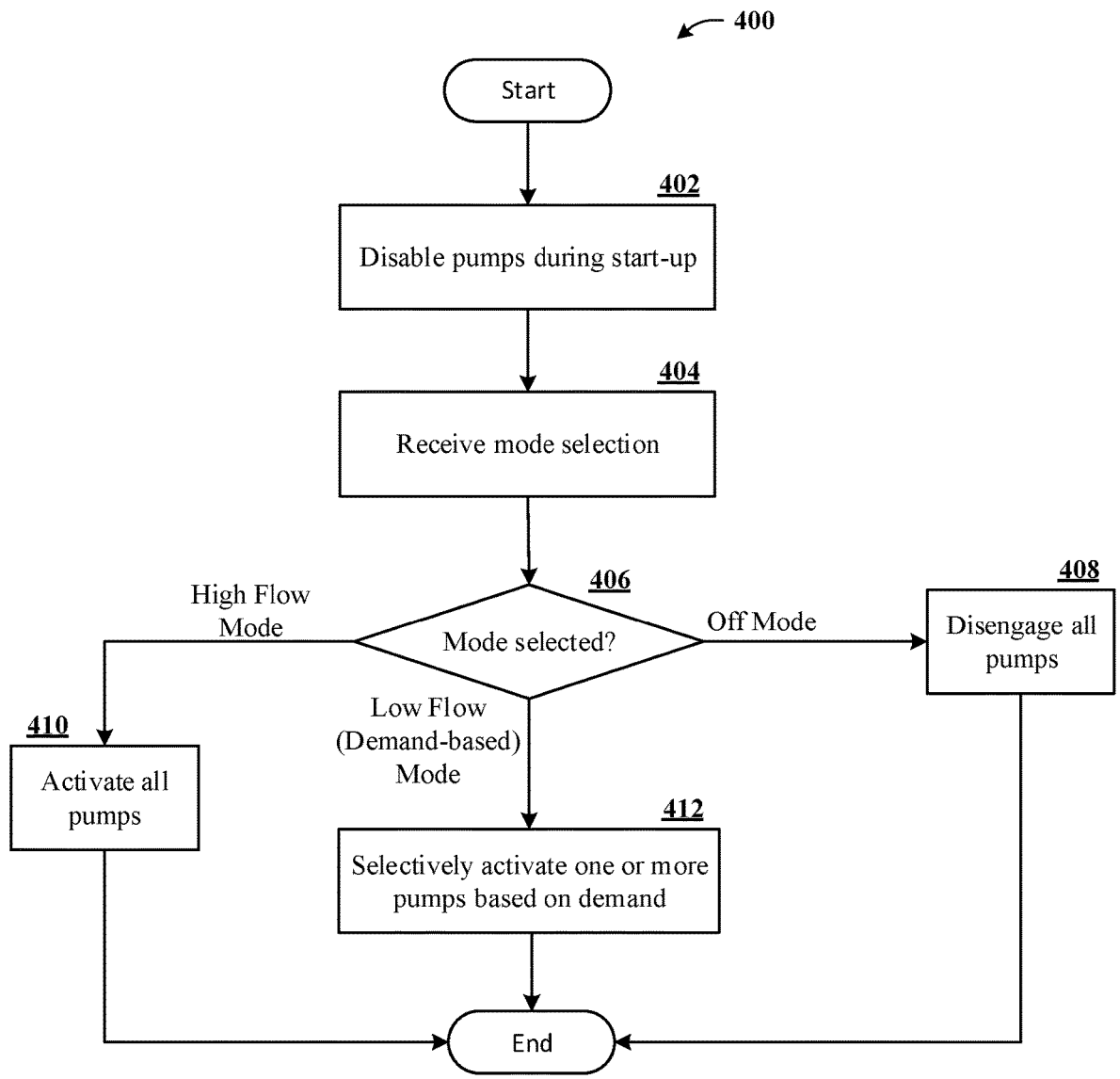
FIG. 4 illustrates an exemplary, non-limiting embodiment of a method of controlling a demand based hydraulic power system according to various aspects.

Referring now to FIG. 4, another embodiment for a control method 400 for a demand based hydraulic system is depicted. The method 400 may be implemented by system 100, for example, and/or executed by controller 110. Further, the method 400 may accept operator input via a menu structure such as structure 300 described above.

In an example, the method 400 may commence at 402 where the pumps are disabled during start-up (e.g. engine start-up). As described above, this may mitigate effects of parasitic starting loads. At 404, a mode selection is received. For example, the mode selection may be input via an operator interface having a menu structure such as structure 300 described above. At 406, the control method may conditionally branch based on the mode selected at 404. For instance, if an off mode is selected, the method 400 proceeds to 408 where all pumps are shutdown. If a high flow mode is selected, the method 400 branches to 410 where all pumps are activated. If a low flow mode is selected, the method moves to 412 where one or more pumps are selectively activated based on demand. For instance, in a two pump system, one pump may be activated by default. The second pump may subsequently activate if demand increases.

Figure 5:
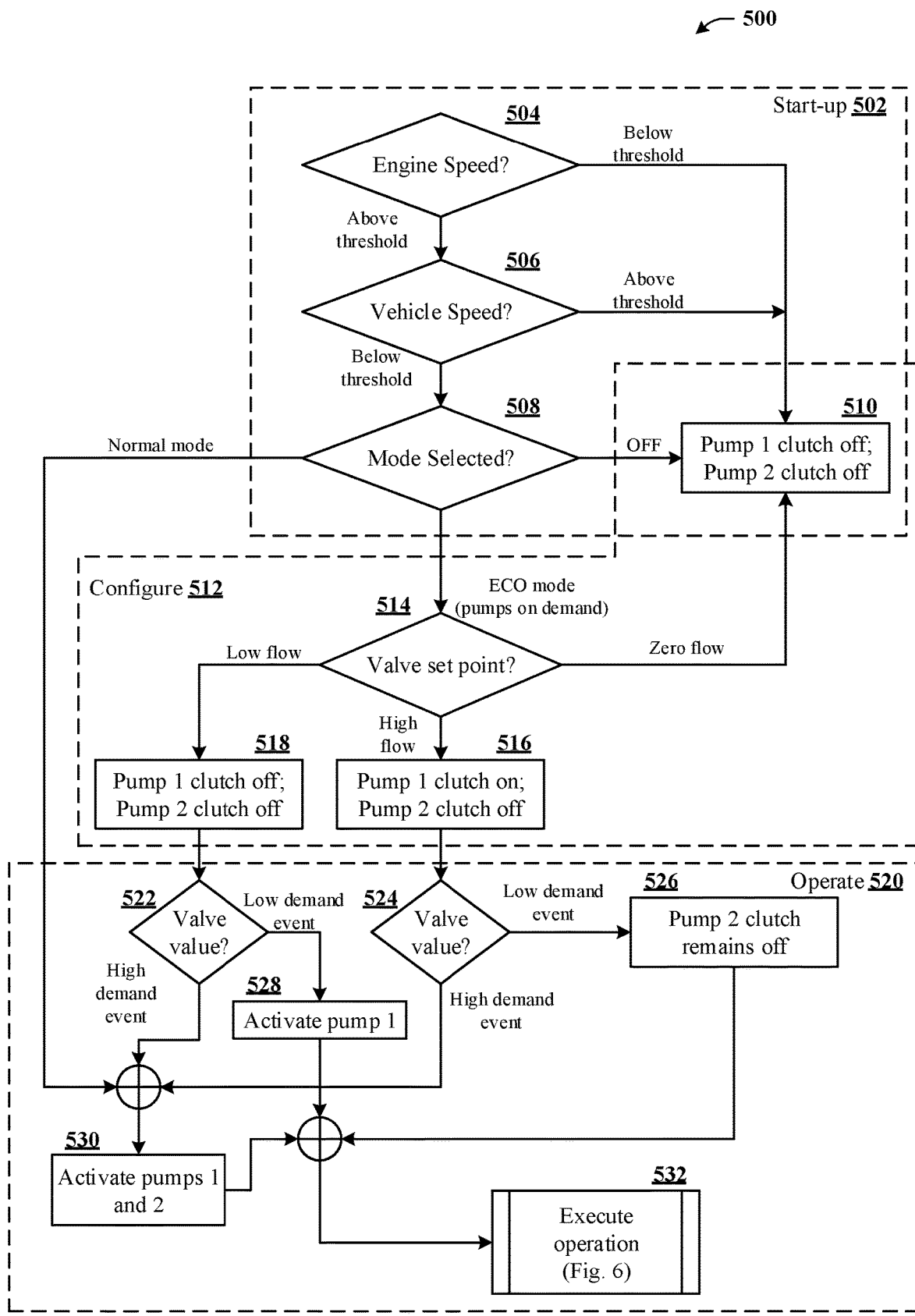
FIG. 5 illustrates an exemplary, non-limiting control flow for a demand-based hydraulic power system in accordance with various aspects.

Turning now to FIG. 5, a control flow 500 for controlling a hydraulic system of an agricultural vehicle is illustrated. Control flow 500 may, in some embodiments, be performed by controller 110 of hydraulic system 100 described above. In particular, the flow may be managed by controller 110 to control first pump system 130 and second pump system 140.

As shown in FIG. 5, flow 500 may be segmented into several stages: a start-up stage 502, a configure stage 512, and an operational stage 520. In the start-up stage 502, the flow may start at 504 with a check on engine speed of the vehicle. If the engine speed is below a predetermined threshold, the flow transitions to 510 where clutches for both a first pump and a second pump are disengaged. If the engine speed is above the predetermined threshold, then, at 506, a check is performed on vehicle speed. If the vehicle speed is above a threshold, the clutches are disengaged at 510. If the vehicle speed is below the threshold, then the flow transitions to 508 where a check on a selected mode is performed.

If an off mode or ECO mode (e.g. demand mode) is selected, the flow moves to the configure stage 512. For the off mode, the flow moves to 510 where the clutches of the first pump and the second pump are disengaged to shut down the pumps. In the ECO mode, the flow moves to 514 where a valve set point is checked. The valve set point may be determined based on an SCV or a hitch PP. If the set point indicates zero flow, the pumps are deactivated at 510. If the set point indicates low flow, then, at 518, the clutches of the first pump and the second pump are initially disengaged. If the set point indicates high flow, then, at 516, the clutch of the first pump is engaged and the clutch of the second pump is disengaged as an initial state.

In the operate stage 520, the hydraulic system of the vehicle is utilized to deliver hydraulic power. The operation of the system is dependent on the mode and/or how the system was configured in the configure stage 512. For example, if the control transitions from 518, then the valve value is checked at 522 to detect demand event. In the case of a low demand event, the first pump is activated at 528 and the operation is executed at 532 (see FIG. 6). In the case of a high demand event, the first pump and the second pump are activated at 530 and the operation is executed at 532.

If the control transitions to the operate stage 520 from 516, then the valve value is checked at 524 to detect a demand event. For a low demand event, the second pump is kept off at 526 and the operation is executed at 532. For a high demand event, the first and second pump are activated and the operation is executed at 532 with both pumps.

Moreover, as shown in FIG. 5, if a normal mode is selected at 508, then both pumps are activated at 530 and an operation is executed at 532.

Figure 6:
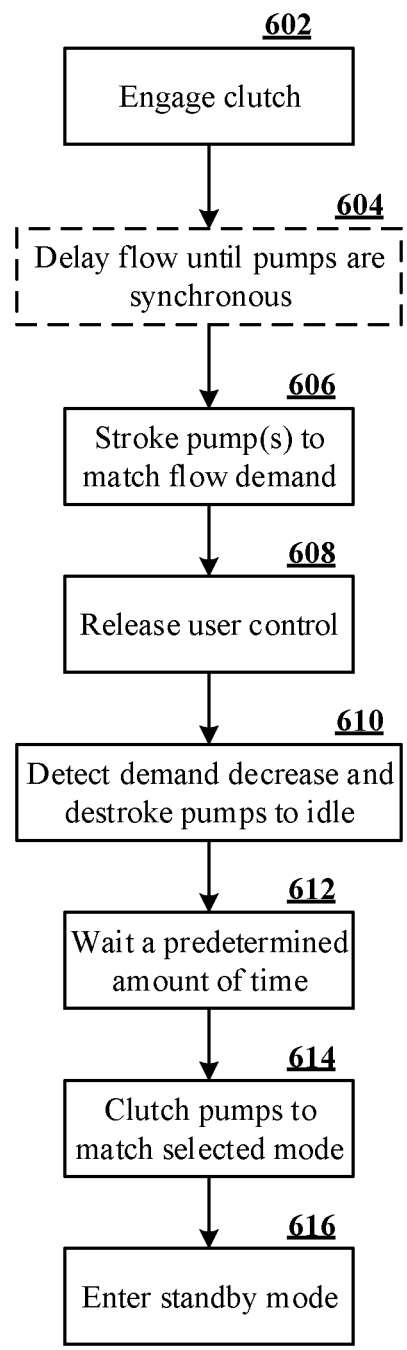
FIG. 6 illustrates an exemplary, non-limiting control flow for a demand-based hydraulic power system in accordance with various aspects.

Turning to FIG. 6, a control flow 532 is illustrated that corresponds to reference numeral 532 of FIG. 5. Control flow 532 is described with reference to a single clutch and/or pump, but it is to be appreciated that the flow may be duplicated (e.g. executed in parallel) for all pumps/clutches as configured or demanded as described above. At 602, a clutch associated with a pump is engaged. At 604, an optional step is performed where flow from the pumps is delayed until pumps are synchronous. For example, step 604 may be performed when one pump is already active and a second pump is being brought online. At 606, the pump(s) are stroked to match flow demand. At 608, user control is released to enable flow control via a valve or PP, for example. At 610, a decrease in demand is detected (e.g. following an operation) and the pump(s) are destroked to an idle state. At 612, a predetermined amount of time without a demand increase is clocked. At 614, one or more clutches are disengaged to match the selected mode. For instance, the clutches and/or pumps are controlled to return to a state following the configure stage 512. At 614, the flow enters a standby mode and waits for another call for hydraulic power.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

The invention claimed is:

1. A system, comprising:
a hydraulic pump coupled to an engine via a clutch;
a second hydraulic pump coupled to the engine via a second clutch, and
a controller configured to control operation of the hydraulic pump, the second hydraulic pump, the clutch, and the second clutch in accordance with a selected mode of a plurality of operating modes, wherein the plurality of operating modes include at least an off mode, a demand mode, and a continuous mode,
wherein, with the demand mode, the controller is configured to selectively and automatically engage or disengage one or more of the clutch or the second clutch in response to changes in demand for hydraulic power,
wherein the hydraulic pump and second hydraulic pump, when coupled to the engine via the clutch and second clutch, respectively, provide hydraulic power to a hydraulic system in tandem.

2. The system of claim 1, wherein the controller disengages the clutch during start-up of the engine.

3. The system of claim 1, wherein the controller is further configured to:
detect an abnormal event associated with the hydraulic pump; and
disengage the clutch in response to detection of the abnormal event to protect the hydraulic pump.

4. The system of claim 1, wherein the controller is further configured to receive a mode selection from an operator.

5. The system of claim 1,
wherein the controller is further configured to control operation of the hydraulic pump and the second hydraulic pump independently based on the selected mode of the plurality of operating modes.

6. The system of claim 5, wherein, when the selected mode is the off mode, the controller disengages the clutch and the second clutch as a default state for the off mode.

7. The system of claim 5, wherein, when is the selected mode is a low flow mode, the controller configures a default state of the clutch and the second clutch based on a detected initial valve set point.

8. The system of claim 7, wherein the clutch and the second clutch are disengaged when the initial valve set point indicates zero flow.

9. The system of claim 7, wherein the clutch is engaged and the second clutch is disengaged when the initial valve set point indicates a low flow, and
wherein the clutch and the second clutch are engaged when the initial valve set point indicates a high flow.

10. The system of claim 5, wherein, when the selected mode is a synchronous speed mode, the controller gradually applies at least one of the clutch or the second clutch as pressure and flow are demanded,
wherein gradually application of the at least one of the clutch or the second clutch occurs until a speed of the pump is synchronous with a speed of the engine.

11. The system of claim 5, wherein, when the selected mode is a high mode, the controller engages the clutch and the second clutch as a default state for the high mode.

12. The system of claim 5, wherein, when the selected mode is the demand mode and an initial state has the hydraulic pump and the second hydraulic pump both disabled, the controller is further configured to selectively and automatically engage at least one of the clutch or the second clutch in response to a demand event for hydraulic power.

13. A method for a hydraulic system of an agricultural vehicle, comprising:
receiving a mode selection from a plurality of modes from an operator via an operator interface, wherein the plurality of modes include at least an off mode, a demand mode, and a continuous mode;
selectively initializing a set of pumps to respective initial states based on the mode selected; and
when the mode selected is the demand mode:
monitoring a level of demand for hydraulic power; and
selectively activating and deactivating one or more hydraulic pumps of the set of pumps in response to the level of demand and a current state of the set of pumps,
wherein the set of pumps, when activated, provide hydraulic power to a hydraulic system in tandem.

14. The method of claim 13, wherein activating the one or more hydraulic pumps of the set of pumps comprises engaging one or more clutches respectively associated with the one or more hydraulic pumps of the set of pumps, wherein the one or more clutches couple the one or more hydraulic pumps of the set of pumps to an engine of the agricultural vehicle.

15. The method of claim 13, further comprising:
detecting a decrease in demand for hydraulic power; and
selectively deactivating one or more hydraulic pumps of the set of pumps in response to the decrease in demand.

16. The method of claim 15, wherein deactivating one or more hydraulic pumps of the set of pumps comprises disengaging one or more clutches respectively associated with the one or more hydraulic pumps of the set of pumps, wherein the one or more clutches couple the one or more hydraulic pumps of the set of pumps to an engine of the agricultural vehicle when engaged.

17. A non-transitory, computer-readable storage medium having stored thereon computer-executable instructions that, when executed by a processor, configure the processor to:
receive a selection of an operating mode from a plurality of operating modes for a hydraulic power system having a plurality of pumps that includes at least a first pump and a second pump, wherein the plurality of modes include at least an off mode, a demand mode, and a continuous mode;
configure a default state of the plurality of pumps in accordance with the operating mode selected; and
when the operating mode selected is the demand mode, adjust a state of the plurality of pumps based on an operational input, wherein the operational input indicates a level of demand for hydraulic power,
wherein the processor is further configured to adjust one or more of the plurality pumps from an on state to an off state, or adjust one or more of the plurality of pumps from an off state to an on state.

18. The non-transitory, computer-readable storage medium of claim 17, wherein, when the operating mode selected is the demand mode, the default state is further configured based on an initial set point of a valve that couples at least one pump of the plurality of pumps to an implement.

19. The non-transitory, computer-readable storage medium of claim 17, wherein, when the operating mode selected is the demand mode, the processor is configured to:
activate the first pump and deactivate the second pump as the default state; and
in response to the operational input indicating an increase in demand for hydraulic power, activate the second pump.

20. The non-transitory, computer-readable storage medium of claim 19, wherein computer-executable instructions further configure the processor to:
detect a decrease in demand for hydraulic power; and
in response to the decrease, deactivate the second pump.

* * * * *